(12) United States Patent
Biverot

(10) Patent No.: US 6,346,928 B1
(45) Date of Patent: *Feb. 12, 2002

(54) IMAGE PRESENTATION METHOD AND ARRANGEMENT

(75) Inventor: Hans Biverot, Hässelby (SE)

(73) Assignee: Celsiustech Electronics AB, Jarfalla (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,859

(22) PCT Filed: Oct. 9, 1996

(86) PCT No.: PCT/SE96/01282

§ 371 Date: Mar. 27, 1998

§ 102(e) Date: Mar. 27, 1998

(87) PCT Pub. No.: WO97/14137

PCT Pub. Date: Apr. 17, 1997

(51) Int. Cl.[7] .............................. G09G 5/00
(52) U.S. Cl. .............................. 345/7; 345/9
(58) Field of Search ................... 345/7, 6, 8, 9; 358/88

(56) References Cited

U.S. PATENT DOCUMENTS

| 4,424,529 A | * | 1/1984 | Roese et al. | 358/88 |
| 5,327,153 A | | 7/1994 | Biverot | 345/5 |
| 5,479,185 A | * | 12/1995 | Biverot | 345/6 |

FOREIGN PATENT DOCUMENTS

| SE | 500 061 | 3/1994 |

* cited by examiner

Primary Examiner—Steven Saras
Assistant Examiner—Uchendu O. Anyaso
(74) Attorney, Agent, or Firm—Connolly Bove Lodge & Hutz LLP

(57) ABSTRACT

A method of presenting a complete image on the retina of an observer, wherein the image is comprised of a large number of pixels located along mutually adjacent lines. The presentation is effected by deflecting a limited number of pixels shown on a display over the image-perceiving area of a retina, wherein these pixels represent consecutively all pixels in the image. According to the invention, the display shows the pixels in at least one band of a limited number of complete lines in the image. The lines in the band are generated parallel with one another and such that each line represents successively the pixels in all lines of the image or a part-image. The band is deflected as a unit over the image-perceiving area of the retina in time with the generation of the lines on the display. The invention also relates to a system for use when carrying out the method.

14 Claims, 3 Drawing Sheets

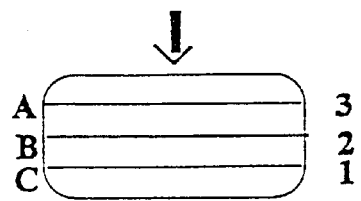 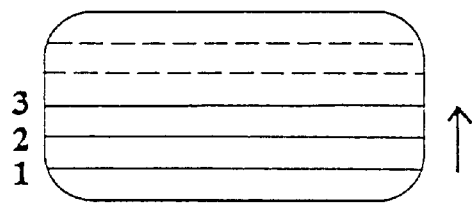
a)
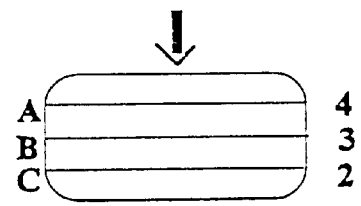 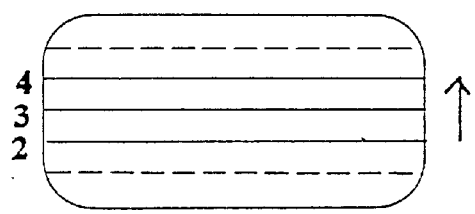
b)
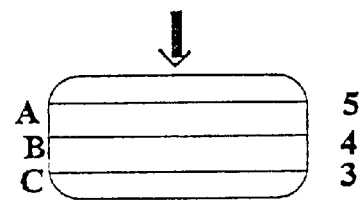 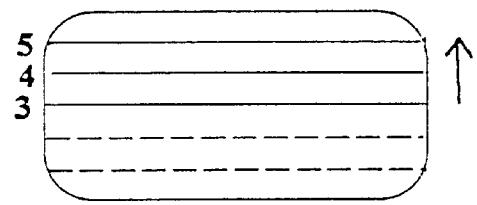
c)
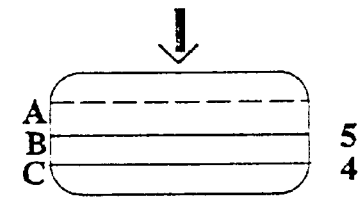 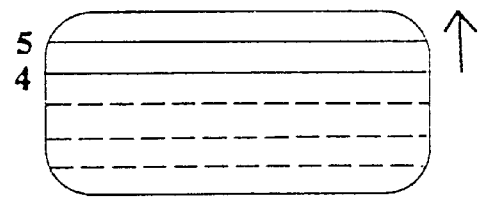
d)
Fig 3A					Fig 3B

IMAGE PRESENTATION METHOD AND ARRANGEMENT The present invention relates to a method of presenting to the retina of an observer a complete image comprised of a large number of pixels, located along mutually adjacent lines, by deflecting a limited number of pixels shown on a display over the image-perceiving area of the retina of the observer, these pixels consecutively representing all pixels in the image. By image-perceiving area is meant the area of the retina which sees the image display. The invention also relates to an system for use when carrying out the method.

Our Swedish Patent Specification No. 9101778-0 describes a system which can be used to present images with the aid of this principle, among other things. The patent specification describes generally a system for presenting an image on the basis of at least two variables for each pixel, such as pixel position and pixel information. The image is thus comprised of a plurality or pixels, each defined by a pixel position given by two angular coordinates in relation to a reference direction from the observer, and by information relating to each pixel with regard to intensity, color, polarization, etc., at each moment in time.

The novel principle disclosed in the aforesaid patent specification enables the image presentation system, or display, to be divided into two parts, more specifically a first display device located at a distance from the observer, and a second display device located in the field of view between the observer and the first display device. It is also necessary for the presentation system to include means for mutually synchronizing the first and the second display devices.

According to the aforesaid patent specification, when imaging with the aid of two mutually separate display devices, these devices can be provided with different combinations of the three variables X-coordinate, Y-coordinate and pixel information, such as intensity, color, polarization, etc. A total of six combinations are possible for dividing these variables between the two display devices.

Our coterminous Swedish Patent Application No. 9503503-6 describes simplifications to the equipment required with some of these combinations, particularly those combinations in which the display device which is located at a distance from the observer is provided with information relating to the X-coordinate of respective pixels, with or without pixel information. This display device will thus display a line which consecutively shows the pixels in all lines of the image or picture. The line may be oriented in desired directions and be comprised of uniformly illuminated pixels or pixels that contain information relating to intensity, color, polarization, etc. This display can thus be a so-called line display.

The second display is suitably carried by the observer in the form of spectacles (goggles) through which the line display can be viewed, and it is necessary to provide the second display device with means for deflecting the observed or viewed line in the other direction, which is suitably perpendicular to the propagation of the line, so as to obtain a complete image on the retina of the observer. It is thus only on the retina that the image exists in its entirety as a mean value formulation over a maximum time period corresponding to the slowness or integration time of the eye.

The luminance of the obtained image may constitute a limitation of this technique. Another limitation is that when showing only one single line on the display, it is not possible to display directly readable information on this line, i.e. without the assistance of further auxiliaries.

The main object of the present invention is to provide an image displaying method and an image display system in accordance with the aforegoing with which those limitations that are incurred when only one single line is deflected are eliminated, among other things.

The invention is based on the realization that this object can be achieved when instead of deflecting an individual line there are simultaneously deflected a band of lines which lines are generated in parallel on a display such that each of these lines successively represents all lines of an image or of a part-image. The image thus "rolls" through the band synchronously with deflection of the band in the opposite direction. The band will therewith "paint" the image over the retina of the observer.

Each line in the image will be activated the same number of times as the number of lines included in the band, therewith increasing luminance by a corresponding factor.

Another advantage afforded by the use a band of lines is that certain pixels in the band can be used to present on the display, information that can be read directly by an observer without the assistance of auxiliary means.

Accordingly, a method of the kind defined in the first paragraph is, in accordance with the invention, mainly characterized in that the display shows the pixels in at least one band of a limited number of complete lines in the image; in that the lines in the band are generated in parallel simultaneously, such that each line represents successively the pixels in all lines of the image or of a part-image; and in that the band is deflected as a unit over the image-perceiving area of the retina synchronously with the generation of the lines on the display.

This technique can be used in the construction of simpler display screens, for instance. Thus, the technique enables present-day display screens which correspond to all lines in the image to be limited to a display screen which shows only a few lines and supplement the screen with a pair of spectacles worn by the observer, for instance. This can provide many advantages in those cases where there is insufficient room for a full scale screen.

Remaining features of the aforedefined method and of a system for carrying out the method will be apparent from the following.

The invention will now be described in more detail with reference to an exemplifying embodiment thereof and also with reference to the accompanying drawings, in which FIG. 1 is a schematic illustration of an inventive system which includes a band display and a deflecting device in the form of a mirror-periscope;

FIG. 2 illustrates the principle of a band display according to FIG. 1; and

FIGS. 3A–B illustrate the modus operandi of the invention.

Shown in FIG. 1 is a band display 1, by which is meant a display that shows one or more bands of preferably closely adjacent lines in an image. Each band may include 3–60 lines, for instance, preferably 5–25 lines. The complete image may be based on a standard 625-line format, for instance, although other formats are also conceivable.

With the intention of simplifying the illustration of the present invention and its working principles, there is shown a three-line band display which presents an image that consists of only five lines.

The reference numeral 2 identifies the light rays from three lines displayed on the display 1. This three-line band is deflected as a unit by a deflecting device in the form of a mirror-periscope which includes a fixed mirror 3 and an oscillating mirror 4. Two such mirror-periscopes may be carried, for instance, by the observer in the form of a pair of spectacles or goggles. The spectacles will deflect the lines represented by the rays 2 on the display vertically over the retina of the eye 5. The deflecting movement of the mirror is suitably represented by a cyclic oscillatory movement of sinusoidal, triangular or linear ramp configuration. When employing non-linear sinusoidal oscillation, the distortion of the image caused by linear deflection can be compensated for in the manner described in our aforementioned co-terminus Swedish Patent Application No. 9503503-6.

As illustrated schematically in FIG. 2, all lines of the image or of a part-image "roll" through the display 1 when practicing the present invention. "Rolling" can be compared with the effect observed on a TV-set when picture syncronization is lost, giving the impression that the picture rolls across the TV-screen.

In the illustrated example, the display is constructed to show three of the image lines simultaneously. The lines are generated in parallel with one another, which can be achieved by delivering the image information of the three lines relevant at each point in time to the display 1 in parallel, ie simultaneously, from a shift register 6. As an alternative to a display operated by three electron beams, the display may comprise a display in which each pixel is comprised of a light-emitting diode or like device, for instance. The pixels in respective lines may therewith be activated in parallel instead of sequentially.

The band of lines presented on the display 1 is deflected with the aid of the deflecting mirror 4 in FIG. 1 synchronously with the generation of the lines, but in a direction opposite to the "rolling movement" on the display. To the observer it will appear that the rolling movement has stopped, although the displayed image actually still continues to roll. As a result, an image containing the full number of lines is "painted" over the observer's retina during one-half period of the oscillatory movement of the mirror. Possibly, only one so-called half-image can be created in interlace format during each half period.

A flutter-free image can be obtained when at least one image field is shown during the eye's integration time, which is normally from 10–20 msec. In this regard, the term image also includes, for instance, a part-image and the like included in a mosaic image.

The principle of the invention will now be explained in more detail with reference to FIGS. 3A–B.

FIG. 3A is a schematic illustration of a band display at four different time points a)–d). The display has three line positions A, B, C for simultaneous showing of three lines of an image as the image rolls through the display, which image includes only five lines in the illustrated case.

FIG. 3B illustrates the manner in which a corresponding image is painted over the image-perceiving area of the observer's retina.

Figure 1:
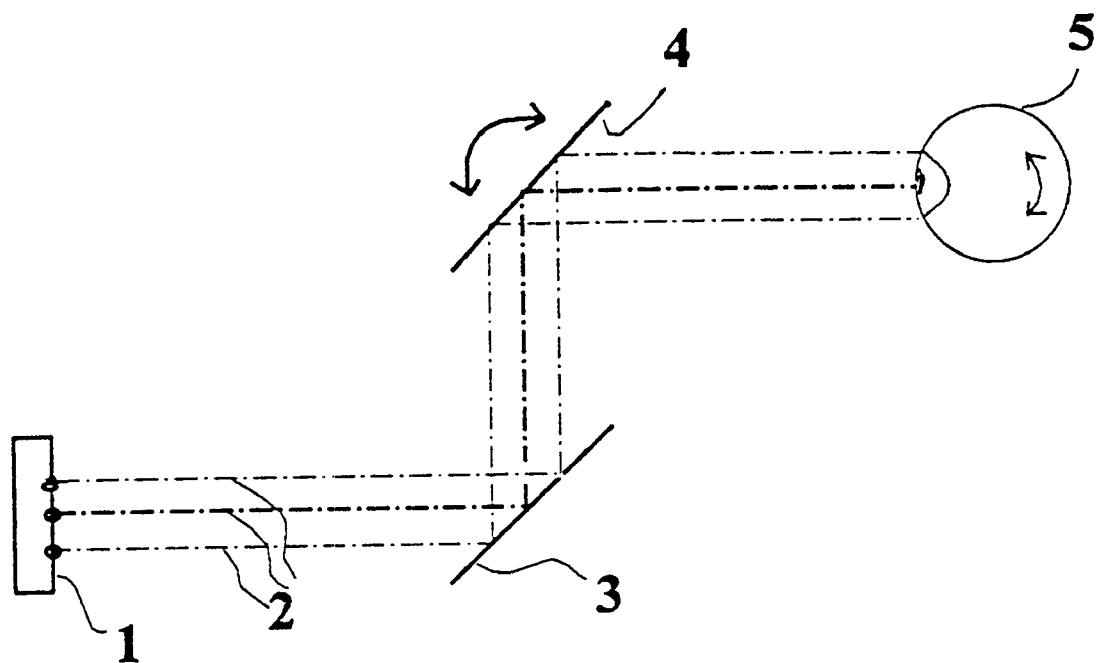
Figure 2:
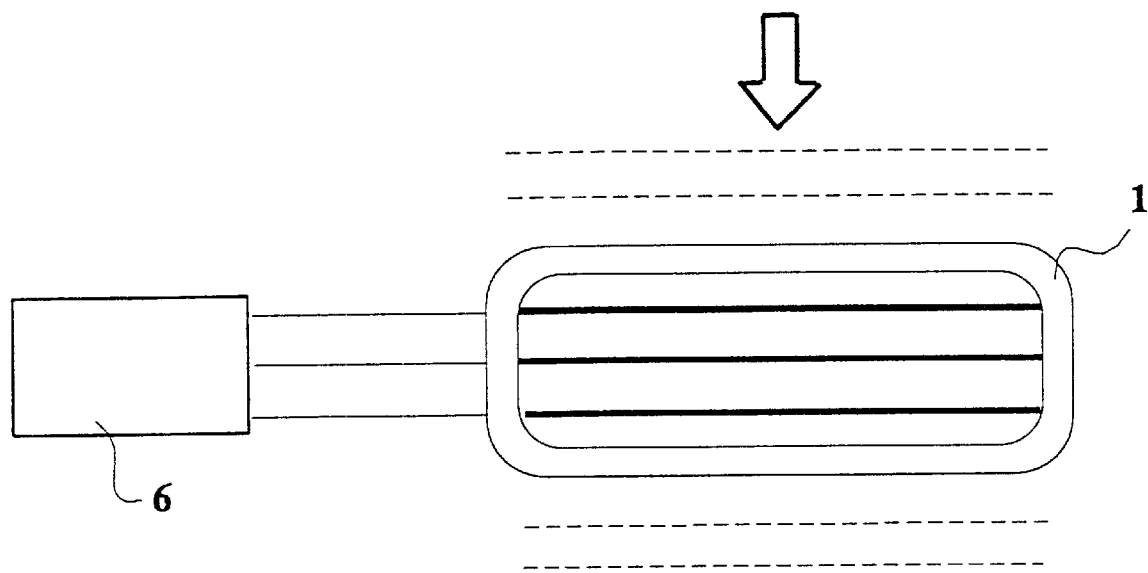

At time point a), the display shows the lines 1, 2, 3 of the complete image, these lines being reproduced in corresponding positions on the retina, through the medium of the deflecting mirror 4 shown in FIG. 1. At the next time point b), the display shows the lines 2, 3, 4, as line 1 has disappeared from the display, and the mirror 4 which swings synchronously with the line generating process has deflected the band of lines shown on the display so that these lines will appear in correct positions on the retina, see the corresponding part-image in FIG. 3B.

Similarly, at the next time point c) the line 2 is no longer seen on the display whereas the line 5 appears for the first time. At time point d), the band of lines begins to disappear from the retina and after a further two steps is prepared to re-enter the image field from below subsequent to a return sweep of the mirror 4 shown in FIG. 1. The image is "painted" up on the retina in this way.

As will be evident from this simplified model, as each complete image or part-image is produced, each line, see for instance lines 3 and 4, will be activated three times, i.e. the same number of times as there are lines on the band display. Consequently, luminance is tripled in comparison with the case when only one line is deflected. The more lines contained by the band, the stronger the luminance.

The aforedescribed principle thus enables the use of a display with only a few lines and nevertheless produce a complete image of high luminance on the observer's retina.

The invention also affords the advantage that when the display includes the requisite number of lines, it can also be used to present information that can be interpreted without the assistance of auxiliary devices in the form of deflecting means. This is achieved by using a given number of pixels on the display for such information. The display can herewith serve two different purposes.

As an alternative to one band of lines, the display may be designed to present simultaneously two or more separate bands either at intervals or without intervals. This requires parallel and synchronized feeding of image information to different parts of the display.

A band of lines can also be deflected with the aid of both flanks of a sinusoidal oscillatory movement of the mirror for instance. In this case, it is necessary to read the information for the pixels in the lines in different directions during the two parts of an oscillating period. Alternatively, the two flanks may be used to deliver different information to both eyes of an observer, thereby enabling a stereoscopic image to be presented to the observer. Triggering of the display lines at desired time points can be achieved readily with the aid of drive circuits known to the person skilled in this art.

The invention has been described in the aforegoing with reference to a band of lines written in the X-direction. The principle is the same, however, irrespective of the direction in which the lines are written, provided that the deflecting means deflects the band in a second direction, normally a direction which is perpendicular to the first direction. Thus, the display can show, for instance, a band of vertical lines which is propagated horizontally by the mirror over the image-perceiving area of the retina. The first display device may also be provided with information concerning the Y-coordinate of respective pixels, wherein deflection in the X-direction takes place in the display device in the immediate proximity of the observer.

As before mentioned, the deflecting means can be conveniently incorporated in a pair of spectacles. Naturally, if desired, only a single deflecting means may be used for both eyes and incorporated in a cyclops-like system. Alternatively, the system may have the form of a monocle.

As an alternative to the aforedescribed mirror-periscope, deflection may, of course, be achieved with the aid of any other suitable opto-mechanical device that describes a suitable oscillatory movement. Furthermore, electro-optical modulators may also be used, for instance. The sinusoidal oscillation referred to in the example may be replaced with another harmonic oscillation, or a combination of such oscillations may be employed.

What is claimed is:

1. A method of presenting a complete image on a retina of an observer, comprising:

showing pixels in at least one band of a limited number of complete lines in an image on a display;

generating the lines in the at least one band in parallel with one another such that each of the lines successively represents the pixels in all lines of the image or all lines of a part-image; and deflecting the at least one band as a unit over the image-perceiving area of the retina synchronously with the generation of the lines on the display, wherein the pixels shown on the display consecutively represent the pixels in the image.

2. A method according to claim 1, wherein the display shows at least one band having three to sixty lines.

3. A method according to claim 1, wherein the display shows at least one band having five to twenty-five lines.

4. A method according to claim 1, wherein the display shows several bands of mutually adjacent lines.

5. A method according to claim 1, further comprising:
using the pixels in the band of lines shown on the display for directly readable information.

6. A method according to claim 1, wherein the deflecting step comprises:
deflecting the band with a cyclic oscillatory movement of sinusoidal form, triangular form, or linear ramp form; and
utilizing the cyclic oscillatory movement for two active deflecting movements of the band with each cycle in mutually opposite directions.

7. A method according to claim 6, wherein the band is deflected during one-half of the cycle to one eye of an observer, and is deflected during the other half of the cycle to the other eye of the observer.

8. A method according to claim 1, wherein the deflecting step comprises deflecting the band with at least one oscillating mirror for each eye, the oscillating mirrors being provided within spectacles through which the display can be observed.

9. A system for presenting a complete image on the retina of an observer, comprising:

a display for showing pixels in at least one band of a limited number of complete lines in an image;

means for generating the lines in the at least one band in parallel with one another such that each of the lines successively represents the pixels in all lines of the image or all lines of a part-image; and means for deflecting the at least one band as a unit over the image-perceiving area of the retina synchronously with the generation of the lines on the display, wherein the pixels shown on the display consecutively represent the pixels in the image.

10. A system according to claim 9, wherein the display simultaneously shows three to sixty lines.

11. A system according to claim 9, wherein the display simultaneously shows five to twenty-five lines.

12. A system according to claim 9, further comprising means for addressing certain pixels in the band shown on the display with information that can be read directly.

13. A system according to claims 9, wherein the deflecting means comprises at least one oscillating mirror.

14. A system according to claim 9, wherein the deflecting means comprises a pair of spectacles through which the display can be observed.

* * * * *